US006700225B1

(12) United States Patent
Barmore

(10) Patent No.: US 6,700,225 B1
(45) Date of Patent: Mar. 2, 2004

(54) DIGITAL ELECTRONIC SWITCHING SYSTEMS

(76) Inventor: Thomas C. Barmore, 4 N 127 Verrill, Addison, IL (US) 60101

(*) Notice: Subject to any disclaimer, the term of this patent is extended or adjusted under 35 U.S.C. 154(b) by 0 days.

(21) Appl. No.: 09/412,162
(22) Filed: Oct. 5, 1999
(51) Int. Cl.[7] .......................... H02B 1/24; H05B 37/02
(52) U.S. Cl. .......................................... 307/125
(58) Field of Search .......................... 307/125, 130, 307/139, 140, 141.4; 200/11 G

(56) References Cited

U.S. PATENT DOCUMENTS 3,761,738 A * 9/1973 Kay et al. .................. 307/106
3,808,456 A * 4/1974 Kay et al. .............. 174/117 A
4,090,107 A * 5/1978 Seib ......................... 307/114
4,133,993 A * 1/1979 Judd ......................... 200/557
4,360,740 A * 11/1982 Conard ...................... 307/134
4,366,351 A * 12/1982 Ditzig ...................... 200/16 R
4,651,022 A * 3/1987 Cowley ...................... 307/114
4,672,229 A * 6/1987 Skarman et al. .......... 200/33 R
4,689,492 A * 8/1987 Peteuil ...................... 307/116
4,736,081 A * 4/1988 Sorrells ..................... 200/525
4,751,401 A * 6/1988 Beigel et al. .............. 307/115
5,818,128 A * 10/1998 Hoffman et al. ......... 200/277.2
6,028,277 A * 2/2000 Bachschmid ............... 200/508

* cited by examiner

*Primary Examiner*—Gregory J. Toatley, Jr.
(74) *Attorney, Agent, or Firm*—Paul H. Gallagher

(57) ABSTRACT

A standard high voltage circuit having a light bulb therein as a load. A low voltage DC circuit has a plurality of parallel manually actuated switches, with output contacts in the high voltage circuit and inputs in the low voltage circuit. A 7414 chip is provided to debounce the DC imposed on the low voltage circuit by the manual switches, and a chip with a toggle function is positioned in series between the 7414 chip and the high voltage circuit. Each manually actuated switch is capable, in each full throw thereof, of producing an OFF/ON/OFF, or ON/OFF/ON sequence.

5 Claims, 3 Drawing Sheets

DIGITAL ELECTRONIC SWITCHING SYSTEMS

FIELD OF THE INVENTION

The invention resides in the field of controlling relatively high voltage circuitry by means of low voltage circuitry.

SUMMARY OF THE INVENTION

The system and apparatus of the invention have particular adaptability to controlling electrical circuits in the home. A main electrical circuit, or load circuit, of for example 120 V, carries an electrical light bulb as a load. The apparatus includes a control circuit involving low voltage, for example 5 V, which includes light gage wire or conductors, such as what is generally known as bell wire commonly used in connection with doorbells.

A principal object of the invention is to provide a high factor of safety. In utilizing such low voltage circuitry, the voltage involved, i.e., 5 V, is not dangerous, and a person may make alterations or changes without taking any extra precautions for safety.

The apparatus can be readily adapted to the ordinary wiring arrangement already existing in a home, or it can be utilized in its entirety, initially in constructing a house.

Another and specific advantage is that a multitude of switches can be provided in the control circuit, and any one switch alone can be actuated for controlling the main high voltage circuit.

By reason of the immediately preceding feature, the number of switches in the low voltage circuit can be changed, i.e. from a small number to a larger number, substantially without changing the circuit, the only requirement being the adding of an extra switch and related conductors to the switches that are already in place. Because of this feature, if a load, such as a light bulb, is already in place, in a room, and more access entries to the room are desired, individual control switches may be added to the control circuit in a simple manner, to accomodate all the added entries to the room, there being no requirement for altering the load circuit.

Still another advantage is that the apparatus of the invention can be easily and readily put in a compact unit or package and easily put in an outlet box that was previously provided without the necessity for removing such an old outlet box with corresponding changes in the load circuit.

Another feature of the invention is the provision of an overcenter switch to be used in the control circuit that in its actuation from one extreme position to the opposite extreme position, a single pulse is produced only momentarily, so as to produce a controlling signal in a pulsing targeting switch, such as HI to LO, or LO to HI. The control switch is stable in each of its opposite extreme positions.

A great advantage is its extreme simplicity, which results in only three major parts, namely the manually actuated switch, the controller, and the light constituting a load.

BRIEF DESCRIPTIONS OF THE INDIVIDUAL FIGURES OF THE DRAWINGS

DETAILED DESCRIPTION OF THE DRAWINGS

Figure 1:
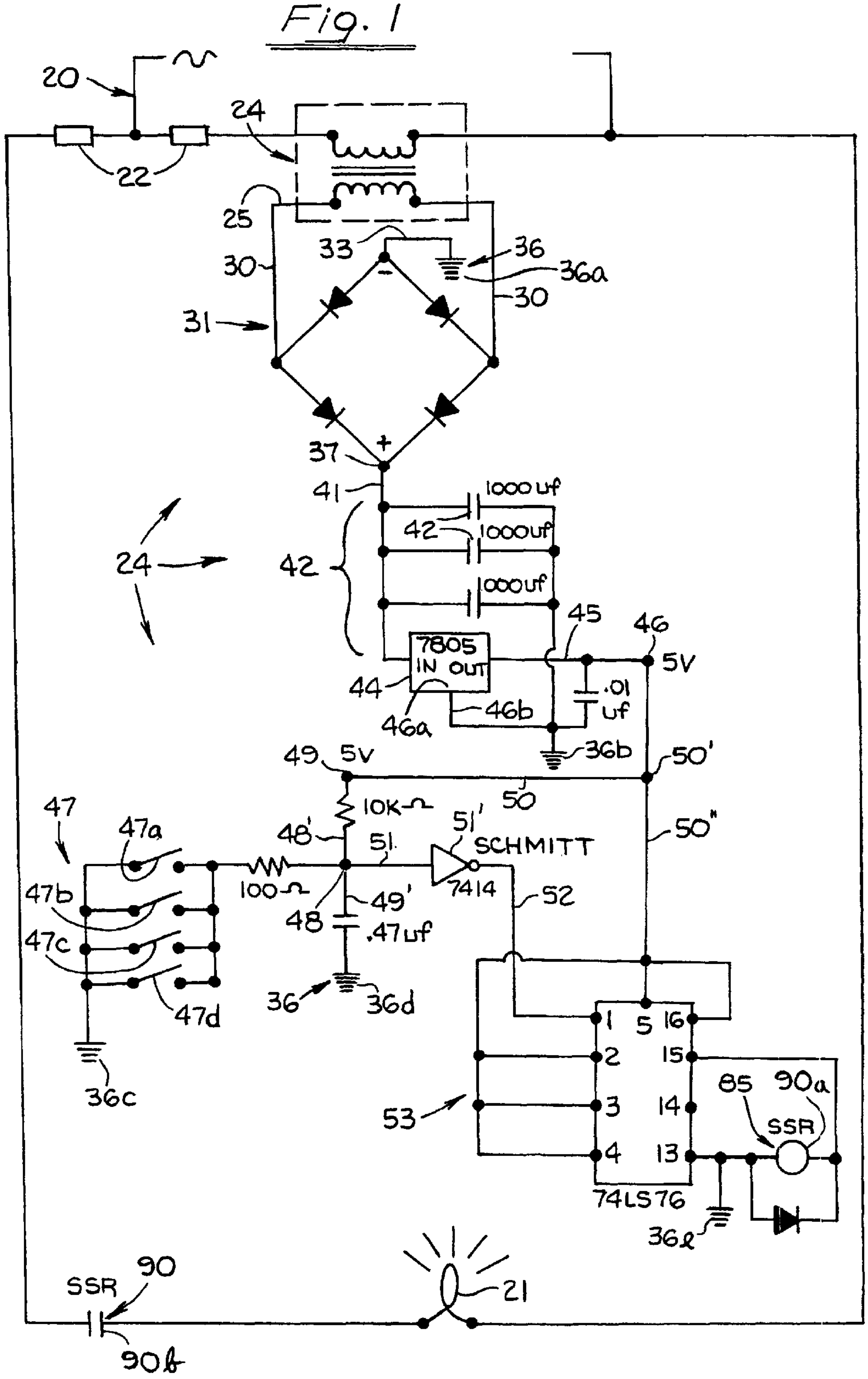
FIG. 1 is a diagram of the circuitry of the apparatus.

FIG. 1 shows a power circuit or main circuit 20 of e.g. 120 VAC, having fuses 22, and including an electric light 21 as a load. The apparatus finds most usage in a home where the load would a usually be a light bulb, but it is not limited to such and may be used in any of various settings, as in other structures, and the load may be a motor, or a pump, etc.

Figure 12:
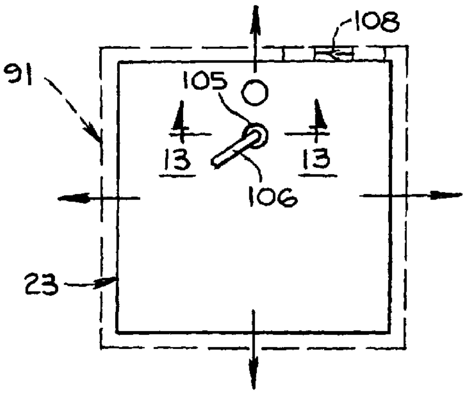
FIG. 12 is a top view of a controller board of the present invention, positioned in a standard outlet box.

The circuitry of FIG. 1 other than the main AC source is preferably contained in a mechanical arrangement on a digital controller board 23 (FIGS. 3, 12) to be fitted in an existing outlet box already installed, described hereinbelow.

Figure 2:
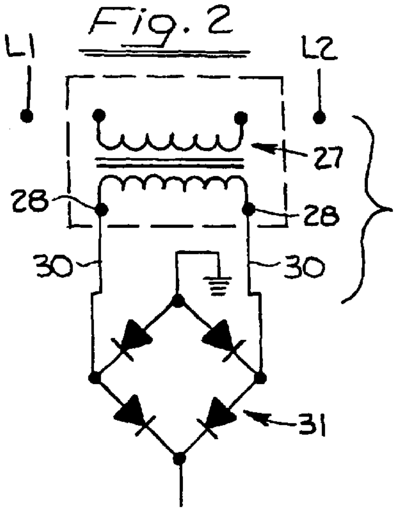
FIG. 2 is a fragment of a circuit, which may be substituted for a corresponding fragment at the top of FIG. 1.

A transformer 24 reduces the 120 V to approximately 12 V, at the output 25. Such transformer may be put out in a complete unit, but the device is also applicable instead to the usual transformer supplied for a doorbell which ordinarily produces approximately 24–30 V. In the latter case the transformer 27 of FIG. 2 may be utilized, having such output at 28 to which the conductors 30 are connected.

The conductors 30 lead from the transformer 24 (or 27, FIG. 2) to a rectifier 31, having an output conductor 33 leading to ground at 36*a*, and another output 37. The transformer 24 may be located anywhere in the house and the conductors therefrom lead to the controller board 23. Ground connections are identified generally at 36, individually identified with postscripts a, b, c, etc.

A conductor 41 leads from the rectifier output 37 through parallel capacitors forming filters 42 to a 7805 chip 44 having an output 45 leading to a contact post 46 of 5 VDC. The chip is grounded at 36*b*.

The capacitors are selected in value and number according to whether the voltage is of 12 VDC or 24–30 VDC referred to above.

A switch unit is shown at 47, at the lower left in FIG. 1, this unit including a plurality of N.O. switches shown diagramatically and referred to below. These switches individually identified with postcript letters, a, b, c, etc. are arranged in parallel, between ground 36*c* and contact post 48 in a conductor 48' that leads from a contact post 49 of 5 V. Closure of any one of these switches 47 shorts the 5 V contact post 49 to ground at 36*c*. A conductor 49' leads from the contact post 48 to ground at 36*d*. A conductor 50 leads from the post 49 to a contact post 50' in a conductor 50" leading to a JK flip flop chip 53.

Figure 3:
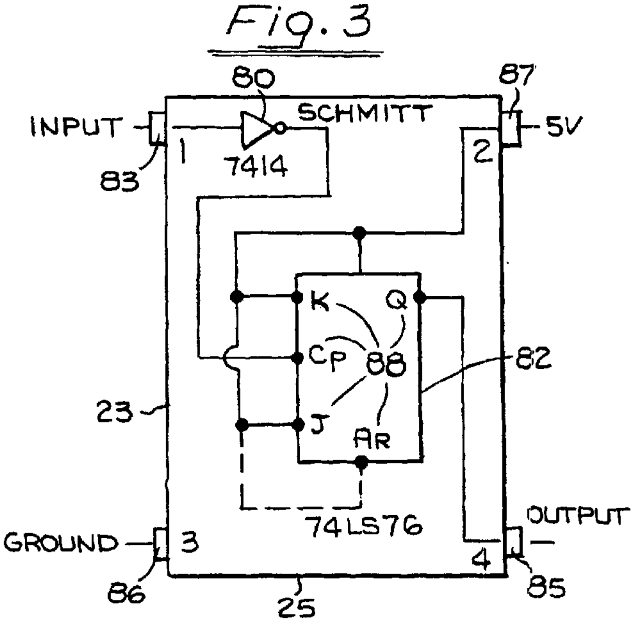
FIG. 3 shows a chip that may be substituted for two chips at the lower right hand corner of FIG. 1.

A conductor 51 leads from the post 48 to a Schmitt 7414 chip or inverter 51', and the output of the latter is connected with a conductor 52 leading to the chip 53. The chip 51' serves to debounce the current to the chip 53, although any chip with a toggle function could be used instead. The 7414 chip, of known kind, produces a change in the status of the circuit in response to successive pulses, that is, if the main circuit is ON, a pulse from one of the switches 47 changes it to OFF, while if the circuit is already OFF, the pulse will change it to ON. A capacitor 54 leads from post 3 to ground 36*e*. Such a capacitor 54 leading to ground is also shown in FIG. 3. The switches may be encapsulated and mounted in a standard 4"×4" electric outlet box, known as a 1900 box.

Figure 4:
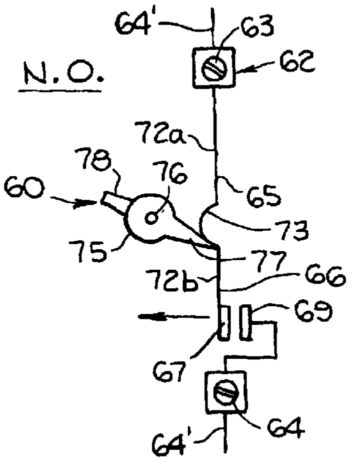
FIG. 4 is a semidiagramatic view of a new control switch, in N.O. position.
Figure 5:
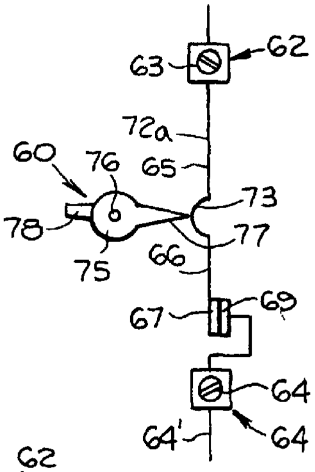
FIG. 5 is a view similar to FIG. 4 showing the switch in closed position.
Figure 6:
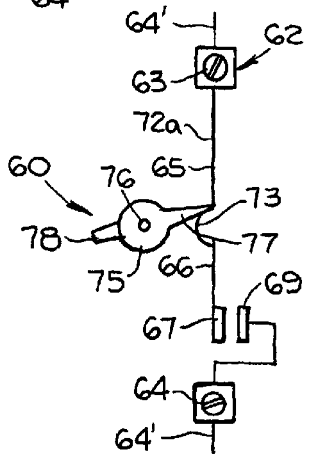
FIG. 6 is a view of the switch of FIGS. 4 and 5 showing the switch OPEN in the extreme opposite position of the actuation lever relative to that FIG. 4.
Figure 7:
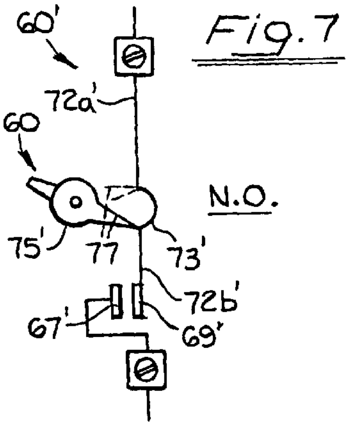
FIG. 7 is a view of another N.O. switch, similar in construction to that of FIG. 4.
Figure 8:
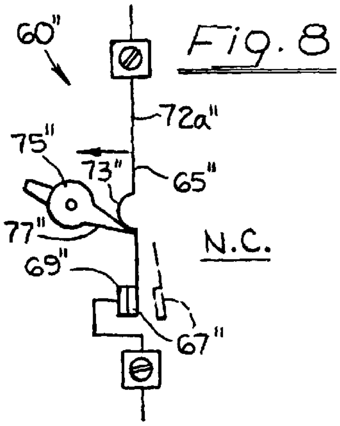
FIG. 8 is a view similar in construction to those of FIGS. 4 and 7 but of N.C. form.
Figure 9:
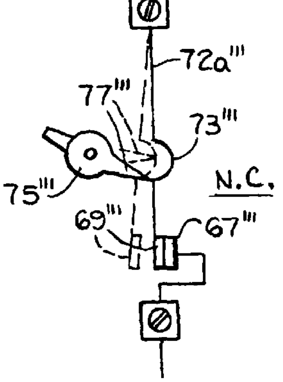
FIG. 9 is a view of the kind of switch of FIG. 7, but of N.C. form.

Reference is now made to the pulsing toggle switches of FIGS. 4–9. These switches are basically similar in construction, but vary in details. The switches of FIGS. 4 and 7 are N.O., and the switches of FIGS. 8 and 9, are N.C.

Referring to FIGS. 4–6, a switch 60, includes a frame 62 having contact posts 63, 64 connected in external circuit 64'. A conducting leaf spring 65 has a first end fixed to the post 63 and a swinging end 66 with a contact 67 thereon.

A fixed contact 69 connected with the post 64 is in position for engagement by the contact 67 upon swinging movement of the leaf spring. The leaf spring is shown in N.O. position, being self-biased to that position, although it may be biased by a compression coil spring if that should be found practical. The leaf spring has spaced straight segments 72*a*, 72*b*, and a bowed element 73 therebetween.

The switch includes a manually actuated lever 75 pivoted at 76, and having a point 77, and a handle 78 for manual actuation.

In actuating the switch, the user grips the handle 78 and moves it from one extreme position to the other, and as here illustrated (FIG. 4), he moves the handle downwardly or counter-clockwise. The bowed element 73 has a convex surface directed toward the lever, and upon the lever engaging that bowed element in the swinging movement of the lever, the leaf spring is moved from its N.O. position in FIG. 4 to CLOSED position in FIG. 5, in which the contact 67 engages the contact 69 and closes circuit through the switch. Upon continued movement of the lever 75, the point proceeds past the bowed element and into position adjacent the straight segment 72*a* (FIG. 6), enabling the leaf spring to spring back to its N.O. position shown. This movement of the lever is a single, continuous, momentary movement, and correspondingly, the closing of the contacts 67–69 is only momentary, providing a single momentary pulse in the circuit.

After such actuation, the switch rests in the position of FIG. 6 until it is actuated again,.and to so actuate it, the handle of the lever is gripped by the hand and moved clockwise, with the same sequence of OPEN-CLOSED-OPEN movement, the momentary closure again providing a single momentary pulse in the circuit.

In the switches of FIGS. 7, 8, 9, the elements are given the same reference numerals as those of FIG. 4, but with single prime, double prime and triple prime indications respectively.

In FIG. 7, the switch 60' is N.O., and structurally similar to that of FIGS. 4–6 but opposite and symmetrical in operation. It is pointed out that the bowed element 73' has its concave side directed toward the lever. The leaf spring is self-biased to closed position, to the left of that shown, but held in OPEN position by the point of the lever engaging the straight segment 72*b*'. As will be obvious from the description of FIGS. 4–6, upon the point of the lever moving into register with the bowed element, the spring leaf moves into CLOSED position, and upon continued swinging movement of the lever, the point moves up and engages the straight segment 72*a*' and again opens the switch.

The apparatus (FIG. 1) may utilize N.O. switches (47), i.e., those of FIGS. 4–6, and 7, but the principles of construction of those switches can also be incorporated in N.C. switches, where the latter are used. The latter switches are shown in FIGS. 8 and 9. In FIG. 8, the leaf spring 65" is self-biased to CLOSED position, i.e. in clockwise direction. The contact element 67" is on the same side of the leaf spring as is the lever 75", and when the leaf spring is so biased to CLOSED position, that contact engages the contact 69".

In actuating this switch (60"), in the manner described above, the lever engages the bowed element and swings the contact 67" to its dot-dash line position, i.e. to OPEN position, and upon further swinging movement of the lever, the point of the lever rides past the bowed element and enables the switch to move again to its CLOSED position. In either closed position, the point 77" does not engage the leaf spring.

The construction of FIG. 9 is similar to that of FIG. 7, but is N.C. rather than N.O. In the present case the contact 69'" is in engagement with the contact 69'" in CLOSED position. Upon swinging movement of the lever (counter-clockwise), the point of the lever first enters into register with the bowed element, and the leaf spring self-biases to OPEN position i.e., clockwise, and upon still further movement, the point of the lever engages the straight element 72*a*'" and again closes the switch.

In the use of all of the switches of FIGS. 4–9, the actuation consists of a full sweep movement of the lever, i.e. from one extreme position to the opposite extreme position, either clockwise or counter-clockwise, in each of the cases, and the switches act according to whether they are of N.O. or N.C. construction. Also an important feature of this construction is to be noted that the intermediate position occurs only momentarily and only a momentary pulse is produced in the circuit. It is not necessary for the user to make two movements of the switch, but only one.

The switches of FIGS. 4–9 in themselves constitute an invention and are so claimed.

Figure 10:
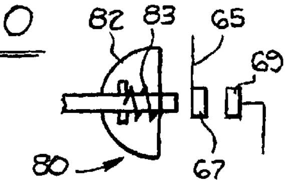
FIG. 10 is a semidiagramatic view of a push button switch that is the equivalent in functioning to either of the switches of FIG. 4 or 7.

The invention is of such breadth that the momentary pulse feature incorporated in switches of FIGS. 4–9, may instead be incorporated in the push button switch as shown in FIG. 10, for inclusion in the system of FIG. 1 instead of the switch 47. This figure shows a push button switch 78, including a push button 80 biased to OPEN position, i.e. to the left in FIG. 10, by a compression spring 81. The contacts 67 and 69 are shown, the former being mounted on the leaf spring 65. Upon the user depressing the push button, to the right in FIG. 10, it pushes the contacts into engagement, and upon release, the push button retracts, enabling the leaf spring to retract under its biasing action. The feature in common with the other switches is that upon merely depressing the push button in one movement, the momentary pulse is produced, and upon releasing the push button, it moves to OPEN position.

The system of FIG. 1 is mounted on the controller board 23, (FIGS. 3, 12), but FIG. 3 shows a Schmitt chip 80, and a JK flip flop chip 82. Input 83, output 85, ground 86 are shown, and a 5 V contact post 87 is included. The chip 82 includes contact posts 88 that are included in the chip 53 of FIG. 3, but selected therefrom and incorporated in the chip 82 of FIG. 3. The contact posts 88 include an input J, an input K, a clock impulse Cp, an asynchronous reset Ar, and an output Q. The chips 80 and 82, themselves, to the exclusion of others, together form a new chip herein disclosed and claimed, which can replace the chips 51' and 53, of FIG. 1. The relay 85 (FIG. 1) is not included in the new chip.

The following is a summary of the main features of the apparatus of the invention. A low voltage control circuit is provided with one or more toggle switches modified to send a single pulse developed in the control circuit for controlling the main circuit.

The output of the 7414 chip 51', directed to 74LS76 chip, 53, providing the feature that for each pulse of the input, the output will be changed from ON to OFF, or OFF to ON.

The output from the chip 53 is utilized to actuate a relay switch 90, preferably SSR (FIG. 1 lower right), the input 90*a* being in the low voltage circuit, and the contacts 90*b* in the main high voltage circuit (FIG. 1 lower left). An SSR is preferably used, but it is within the scope of the invention to utilize a mechanical relay instead, if desired. The size of the load determines the size of the relay to be used.

The foregoing elements of the, low voltage control circuit are mounted on the controller board 23, which is in the form of a printed circuit board, forming a digital component.

Figure 11:
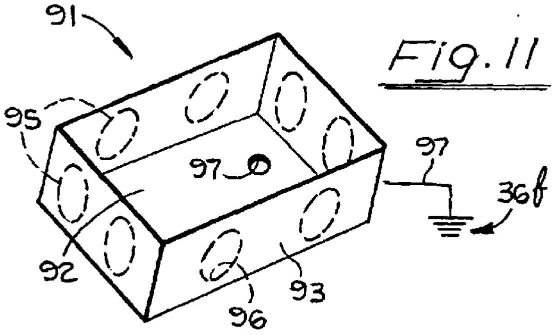
FIG. 11 is a perspective view of an outlet box, of previously known kind.

An important feature of the invention is the mounting of such printed circuit board in a standard metal outlet box. Such an outlet box is shown at 91 in FIG. 11, having a bottom element or plate 92, and a surrounding wall 93, the wall having a plurality of knock-outs 95, which include disks which can be easily knocked out leaving holes 96 for running wires therethrough. The bottom element 92 is provided with a threaded hole 97 for receiving a mounting screw for mounting the box in place in the building. A ground line 97 leads from the box to ground at 36*f*.

Figure 13:
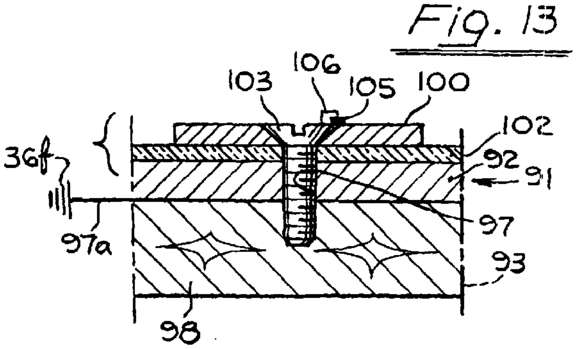
FIG. 13 is a large scale sectional view taken at line 13—13 of FIG. 12.

The controller board 23 is of flat form and smaller than the IFS knock-out box and easily fits within it. FIG. 13 shows a structural element 98 of the building, and the outlet box 91 mounted thereon. The hole 97 is here indicated for receiving a screw 103 for mounting both the outlet box and digital controller board on the structural element 98.

The controller board 23 includes a main panel 100 and a layer of insulation 102, and the screw 103 is inserted through the hole 97 in the controller board and the insulation layer into the structural element 98. The controller board has a conducting element 105, such as solder, (FIG. 13) on the screw for grounding the desired elements of the printed circuit board. Leading from this solder element is a conductor 106 (see also FIG. 12) for connecting the various conductors in the printed circuit board.

The completed circuit board is placed in the knock-out box, and as in usual procedure, the knock-out disks are knocked out as desired, and then the external wiring is inserted through the holes. Thereupon a cover may be reapplied to the knock-out box.

Suitable releasable catch means 108 (FIG. 12) of known kind and here shown diagrammatically, may be utilized for temporarily holding the controller board in the knock-out box in the installing steps.

This mounting of the circuit board constitutes conversion of original wiring in a building, to control by a low voltage, digital control circuit. However, in a new installation, a complete new box with the components therein is utilized.

End of descriptive specification

What is claimed is:

1. Switching system for controlling an electrical first circuit in which high voltage is utilized for energizing a load in the circuit, and having a main switch in the first circuit, comprising, a low voltage second circuit, a transformer operatively connected between the circuits for providing low voltage in the second circuit, a 7414 inverter operatively interconnected between the high voltage circuit and the low voltage circuit, and a plurality of manual toggle switches in the second circuit, each toggle switch including, a frame having spaced contact posts for connection with electrical conductors, a conducting leaf spring secured at a first, fixed, end to a first of the contact posts, and carrying a movable contact element at a second, swinging, end adjacent the second of the contact posts, the leaf spring being self biased to a position wherein the movable contact element is in a CLOSED position relative to the second of the contact posts, the leaf spring having a straight portion with segments adjacent its ends, and a bowed element between such segments, the toggle switch including a lever pivoted on the switch frame and having a point engagable with either the straight portion, or the bowed element, of the leaf spring, but not both, and operable, upon manual swinging of the lever at each of the opposite ends, for moving the swinging end of the leaf spring into CLOSED position relative to the second of the contact posts.

2. The switching system of claim 1 wherein, in the N.C. position of the switch, the movable contact element is on the side of the second contact post nearest the lever, the bowed element has a convex surface directed toward the lever, and the point of the lever when in register with the straight portion does not engage it, but when it is in register with the bowed element, it does engage it.

3. The switching system of claim 1 wherein, in the N.C. position of the switch, the movable contact element is on the side of the second contact opposite the lever, the bowed element has a concave surface directed toward the lever, and the point of the lever when in register with the straight portion does engage it, but when it is in register with the bowed element, it does not engage it.

4. A plurality of toggle switches in mutually parallel arrangement and independently actuatable, a frame having spaced contact posts for connection with electrical conductors the low voltage includes a 74LS76 chip in series with the 7414 chip, and each toggle switch including, a frame having spaced contact posts for connection with electrical conductors, a conducting leaf spring secured at a first, fixed, end to a first of the contact posts and carrying a movable contact element at a second, swinging, end adjacent a second of the contact posts, the leaf spring being self-biased to a position wherein the movable contact element is in a CLOSED position relative to the second of the contact posts, the leaf spring having a straight portion with segments adjacent its ends, and a bowed element between such segments, the toggle switch including a lever pivoted on the switch frame and having a point engagable with either the straight portion, or the bowed element, of the leaf spring, but not both, and operable upon manual swinging of the lever at each of the opposite ends, for moving the swinging end of the leaf spring into CLOSED position relative to the second of the contact posts.

5. The switching system according to claim 4 wherein, in the N.C. position of the switch, the movable contact element is on the side of the second contact post near the lever, the bowed element has a convex surface directed toward the lever, and the point of the lever when in register with the straight portion does not engage it, but when it is in register with the bowed element, it does engage it.

* * * * *